(12) United States Patent
Rahman et al.

(10) Patent No.: US 10,152,495 B2
(45) Date of Patent: Dec. 11, 2018

(54) VISUAL SEARCH IN REAL WORLD USING OPTICAL SEE-THROUGH HEAD MOUNTED DISPLAY WITH AUGMENTED REALITY AND USER INTERACTION TRACKING

(71) Applicant: QUALCOMM Incorporated, San Diego, CA (US)

(72) Inventors: Md Sazzadur Rahman, San Diego, CA (US); Kexi Liu, San Diego, CA (US); Martin H. Renschler, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 23 days.

(21) Appl. No.: 14/151,664

(22) Filed: Jan. 9, 2014

(65) Prior Publication Data

US 2015/0049113 A1 Feb. 19, 2015

Related U.S. Application Data

(60) Provisional application No. 61/867,579, filed on Aug. 19, 2013.

(51) Int. Cl.
*G06T 19/00* (2011.01)
*G06F 3/01* (2006.01)
(Continued)

(52) U.S. Cl.
CPC ..... *G06F 17/30277* (2013.01); *G02B 27/017* (2013.01); *G06F 3/013* (2013.01);
(Continued)

(58) Field of Classification Search
CPC .... G06F 3/04842; G06F 3/017; G06F 3/0488; G06F 3/013; G06F 17/014;
(Continued)

(56) References Cited

U.S. PATENT DOCUMENTS

| 8,223,088 B1 * | 7/2012 | Gomez | G02B 27/017 345/7 |
| 8,558,759 B1 * | 10/2013 | Prada Gomez | G06F 3/017 345/156 |

(Continued)

OTHER PUBLICATIONS

Anonymous: "Google Glass is a Privacy Nightmare—SlashGeek," Feb. 26, 2013 (Feb. 26, 2013), XP055202150, Retrieved from the Internet: URL: http://www.slashgeek.net/2013/02/26/google-glass-privacy/ [retrieved on Jul. 14, 2015].

(Continued)

*Primary Examiner* — Chante Robinson
(74) *Attorney, Agent, or Firm* — Arent Fox, LLP

(57) ABSTRACT

A method, an apparatus, and a computer program product conduct online visual searches through an augmented reality (AR) device having an optical see-through head mounted display (HMD). An apparatus identifies a portion of an object in a field of view of the HMD based on user interaction with the HMD. The portion includes searchable content, such as a barcode. The user interaction may be an eye gaze or a gesture. A user interaction point in relation to the HMD screen is tracked to locate a region of the object that includes the portion and the portion is detected within the region. The apparatus captures an image of the portion. The identified portion of the object does not encompass the entirety of the object. Accordingly, the size of the image is less than the size of the object in the field of view. The apparatus transmits the image to a visual search engine.

27 Claims, 9 Drawing Sheets

(51) Int. Cl.
  *G06F 3/0484* (2013.01)
  *G06F 3/0488* (2013.01)
  *G06F 17/30* (2006.01)
  *G02B 27/01* (2006.01)
(52) U.S. Cl.
  CPC ........ *G06F 3/017* (2013.01); *G06F 17/30247* (2013.01); *G06F 17/30637* (2013.01); *G06F 17/30864* (2013.01); *G06F 17/30879* (2013.01); *G06T 19/006* (2013.01); *G02B 2027/014* (2013.01); *G02B 2027/0138* (2013.01); *G02B 2027/0187* (2013.01)
(58) Field of Classification Search
  CPC ........... G06F 17/0187; G06F 3/004842; G06F 17/30277; G06F 17/30247; G06F 17/30637; G06F 17/30864; G06F 17/30879; G06T 19/006; G02B 27/017; G02B 2027/0138; G02B 2027/014; G02B 2027/0187; G02B 19/006
  USPC .............................. 345/156, 8, 418, 629–635
  See application file for complete search history.

(56) References Cited

U.S. PATENT DOCUMENTS

| | | | | |
|---|---|---|---|---|
| 8,912,979 | B1* | 12/2014 | Gomez | G09G 3/001 345/7 |
| 9,052,804 | B1* | 6/2015 | Starner | G06F 1/163 |
| 9,298,784 | B1* | 3/2016 | Matsakis | G06F 17/30554 |
| 9,852,156 | B2* | 12/2017 | Petrou | G06F 17/30247 |
| 2011/0025873 | A1* | 2/2011 | Wang | G06F 17/30247 348/222.1 |
| 2011/0029547 | A1* | 2/2011 | Jeong | G06F 3/0482 707/758 |
| 2011/0137895 | A1* | 6/2011 | Petrou | G06F 17/30241 707/723 |
| 2011/0138317 | A1* | 6/2011 | Kang | G06F 3/011 715/780 |
| 2013/0050258 | A1 | 2/2013 | Liu et al. | |
| 2013/0275411 | A1* | 10/2013 | Kim | G06F 17/30277 707/722 |
| 2013/0293530 | A1* | 11/2013 | Perez et al. | 345/418 |
| 2013/0293580 | A1* | 11/2013 | Spivack | G06Q 30/0643 345/633 |
| 2013/0307771 | A1* | 11/2013 | Parker | G06F 3/013 345/158 |
| 2013/0335303 | A1* | 12/2013 | Maciocci | G02B 27/017 345/8 |
| 2014/0106710 | A1* | 4/2014 | Rodriguez | 455/411 |
| 2014/0149376 | A1* | 5/2014 | Kutaragi | G06K 9/4676 707/706 |
| 2014/0168056 | A1* | 6/2014 | Swaminathan | G06K 9/00604 345/156 |
| 2014/0267770 | A1* | 9/2014 | Gervautz | H04N 5/23296 348/169 |
| 2014/0310256 | A1* | 10/2014 | Olsson | G06F 3/013 707/706 |
| 2014/0317104 | A1* | 10/2014 | Isaacs | G06F 17/30637 707/728 |
| 2014/0347265 | A1* | 11/2014 | Aimone et al. | 345/156 |
| 2015/0040074 | A1* | 2/2015 | Hofmann | G06T 19/006 715/852 |
| 2015/0070390 | A1* | 3/2015 | Kasahara | G06F 3/01 345/633 |
| 2015/0160461 | A1* | 6/2015 | Starner | G06F 3/013 345/156 |
| 2015/0177833 | A1* | 6/2015 | Vennstrom | G06F 3/013 345/156 |
| 2015/0193098 | A1* | 7/2015 | Kauffmann | G06F 3/0484 715/771 |
| 2016/0098093 | A1* | 4/2016 | Cheon | G06F 3/0484 345/156 |
| 2017/0193107 | A1* | 7/2017 | Imbruce | G06F 17/30864 |
| 2017/0286493 | A1* | 10/2017 | Petrou | G06F 17/30528 |

OTHER PUBLICATIONS

Ajanki A., et al., "An Augmented Reality Interface to Contextual Information", Virtual Reality, Springer-Verlag, Lo, vol. 15, No. 2-3, Dec. 16, 2010, XP019911650, pp. 161-173, ISSN: 1434-9957, DOI: 10.1007/S10055-010-0183-5.

Ajanki A., et al., "Contextual Information Access With Augmented Reality", Machine Learning for Signal Processing (MLSP), 2010 IEEE International Workshop on, IEEE, Piscataway, NJ, USA, Aug. 29, 2010, XP031765933, pp. 95-100, ISBN: 978-1-4244-7875-0.

International Search Report and Written Opinion—PCT/US2014/051717—ISA/EPO—dated Mar. 23, 2015.

Toyama T. et al., "Gaze-based Online Face Learning and Recognition in Augmented Reality", Proceedings of the IUI 2013 Workshop on Interactive Machine Learning, IUI Workshop on Interactive Machine Learning, Poster Session, located at 18th International Conference on Intelligent User Interfaces, Mar. 19, 2013 (Mar. 19, 2013), pp. 1-3, XP055148119, Santa Monica, CA, USA Retrieved from the Internet: URL:http://www.dfki.de/web/forschung/publikationen/renameFileForDownload?filename=iui2012-ml-workshop2.pdf&file_id=uploads_1947 [retrieved on.

* cited by examiner

VISUAL SEARCH IN REAL WORLD USING OPTICAL SEE-THROUGH HEAD MOUNTED DISPLAY WITH AUGMENTED REALITY AND USER INTERACTION TRACKING

CROSS-REFERENCE TO RELATED APPLICATION(S)

This application claims the benefit of U.S. Provisional Application Ser. No. 61/867,579, entitled "Improving Visual Search in Real World Using Optical See-Through HMD with Augmented Reality and Eye Tracking" and filed on Aug. 19, 2013, which is expressly incorporated by reference herein in its entirety.

BACKGROUND

Field

The present disclosure relates generally to augmented reality (AR) devices, e.g., AR eyeglasses, having optical see-through head mounted displays (HMD) and user interaction capability, and more particularly, to conducting online visual searches in real world using such AR devices. AR is a technology in which a user's view of the real world is enhanced with additional information generated from a computer model. The enhancements may include labels, 3D rendered models, or shading and illumination changes. AR allows a user to work with and examine the physical real world, while receiving additional information about the objects in it.

Background

AR devices typically include an optical see-through HMD and one or more user input mechanisms that allow users to simultaneously see and interact with their surroundings while interacting with applications, such as e-mail and media players. User input mechanisms may include one or more of gesture recognition technology, eye tracking technology, and other similar mechanisms.

In AR devices, also referred to herein as HMD systems, virtual objects displayed in the HMD screen augment real world scenes viewed by a user through the HMD. For example, a person in the field of view of a user may be augmented with her name, an artwork may be augmented with descriptive information, and a book may be augmented with its price and so on.

With such an HMD system, a user can perform a visual search to obtain more information about a specific object visible in a real-world scene, i.e., within the field of view of the user. During the visual search, the HMD system generally takes a snapshot of the scene in the field of view, conducts a search using an online visual search engine (e.g. Google Goggles), retrieves the results, and displays the results. The results are displayed on the HMD screen to provide an augmented reality scene to the user that includes the real-world scene, with the object just searched visible through the HMD, and the augmented reality search result.

A problem with this visual search approach is that other objects may be present in the real-world scene resulting in inaccurate search results and redundant or extraneous data transfer to the online visual search engine. To work around this issue, a user may have to move closer to the object of interest so that the object of interest approximately covers her entire field of view. Although this may work for visual searching with a Smartphone, wherein a user zooms in on the object to be searched and takes a picture, this approach is not desirable for optical see-through HMD systems in that its requires the user to move and thus may not provide a good user experience.

SUMMARY

In an aspect of the disclosure, a method, an apparatus, and a computer program product for conducting online visual searches through an augmented reality (AR) device having an optical see-through head mounted display (HMD) are disclosed. An apparatus identifies a portion of an object in a field of view of the HMD based on user interaction with the HMD. The portion includes searchable content, such as a barcode. The user interaction may be an eye gaze or a gesture. A user interaction point in relation to the HMD screen is tracked to locate a region of the object that includes the portion and the portion is detected within the region. The apparatus captures an image of the portion. The identified portion of the object does not encompass the entirety of the object. Accordingly, the size of the image is less than the size of the object in the field of view. The apparatus transmits the image to a visual search engine.

DETAILED DESCRIPTION

Figure 1:
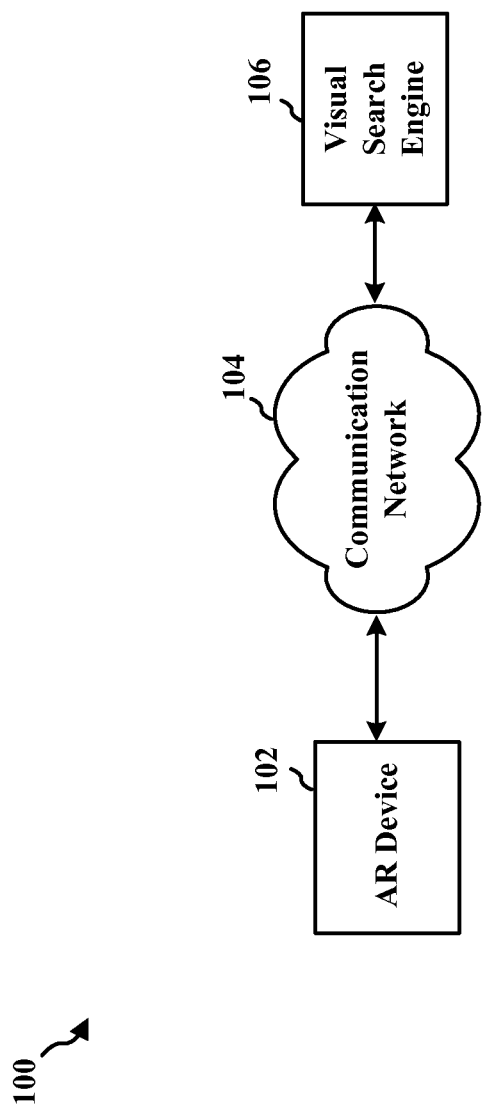
FIG. 1 is a diagram illustrating an online visual search system for conducting online searches of objects visible through an AR device having an optical see-through HMD.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of visual searching through an AR device having an optical see-through HMD and user interaction tracking will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating a visual online search system 100 for conducting online searches of objects visible through an optical see-through HMD with augmented reality, herein referred to as an AR device or an HMD system. The online search system 100 includes an AR device 102, a communications network 104, and a visual search engine 106. The AR device 102 captures an image of an object seen through a HMD and transmits the image to the visual search engine 106 over the communications network 104. The visual search engine 106 conducts an online search of the object captured in the image using known technology and sends the results to the AR device 102 over the communications network 104. The AR device 102 displays the search results as an augmented reality in the HMD.

Figure 2:
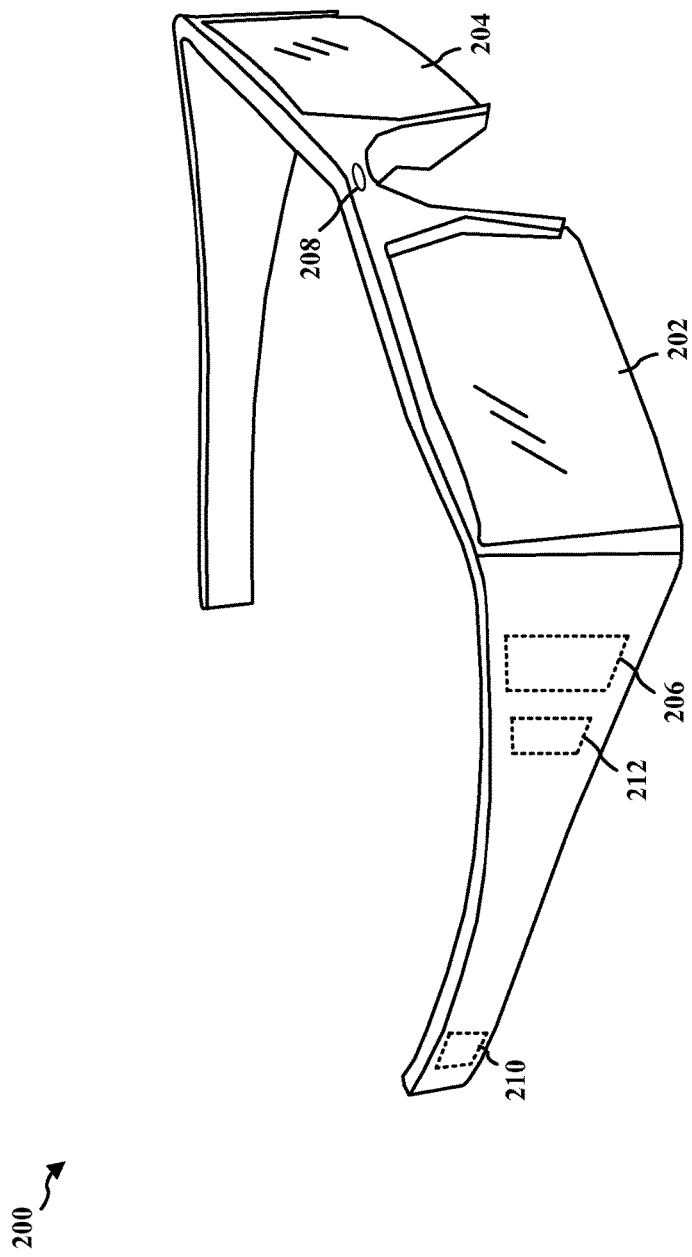
FIG. 2 is an illustration of an AR device in the form of a pair of eyeglasses.

FIG. 2 is an illustration of an example AR device 200 in the form of a pair of eyeglasses. The AR device 200 is configured such that the user of the device is able to view real-world scenes through optical see-through HMDs together with content displayed on the HMDs, including both two-dimensional (2D) and three-dimensional (3D) AR content. The AR device 200 may also be configured to allow the user to interact with the content and possibly with remote devices, systems or networks through wireless communication. The AR device may also provide feedback to the user as a result of such interactions, including for example, audio, video or tactile feedback. To these ends, the example AR device 200 includes a pair of optical see-through HMDs 202, 204, an on-board processing system 206, one or more sensors, such as a scene camera 208, one or more eye tracking components (not visible) for each of the right eye and left eye, one or more user-interaction feedback devices 210 and a transceiver 212.

The processing system 206 and the eye tracking components provide eye tracking capability. Depending on the eye tracking technology being employed, eye tracking components may include one or both of eye cameras and infra-red emitters, e.g. diodes. The processing system 206 and the scene camera 208 provide gesture tracking capability.

The feedback devices 210 provide perception feedback to the user in response to certain interactions with the AR device. Feedback devices 210 may include a speaker or a vibration device. Perception feedback may also be provided by visual indication through the HMD.

The transceiver 212 facilitates wireless communication between the processing system 206 and remote devices, systems or networks. For example, the AR device may communicate with remote servers through the transceiver 212 for purposes of remote processing, such as on-line searches through remote search engines.

Figure 3:
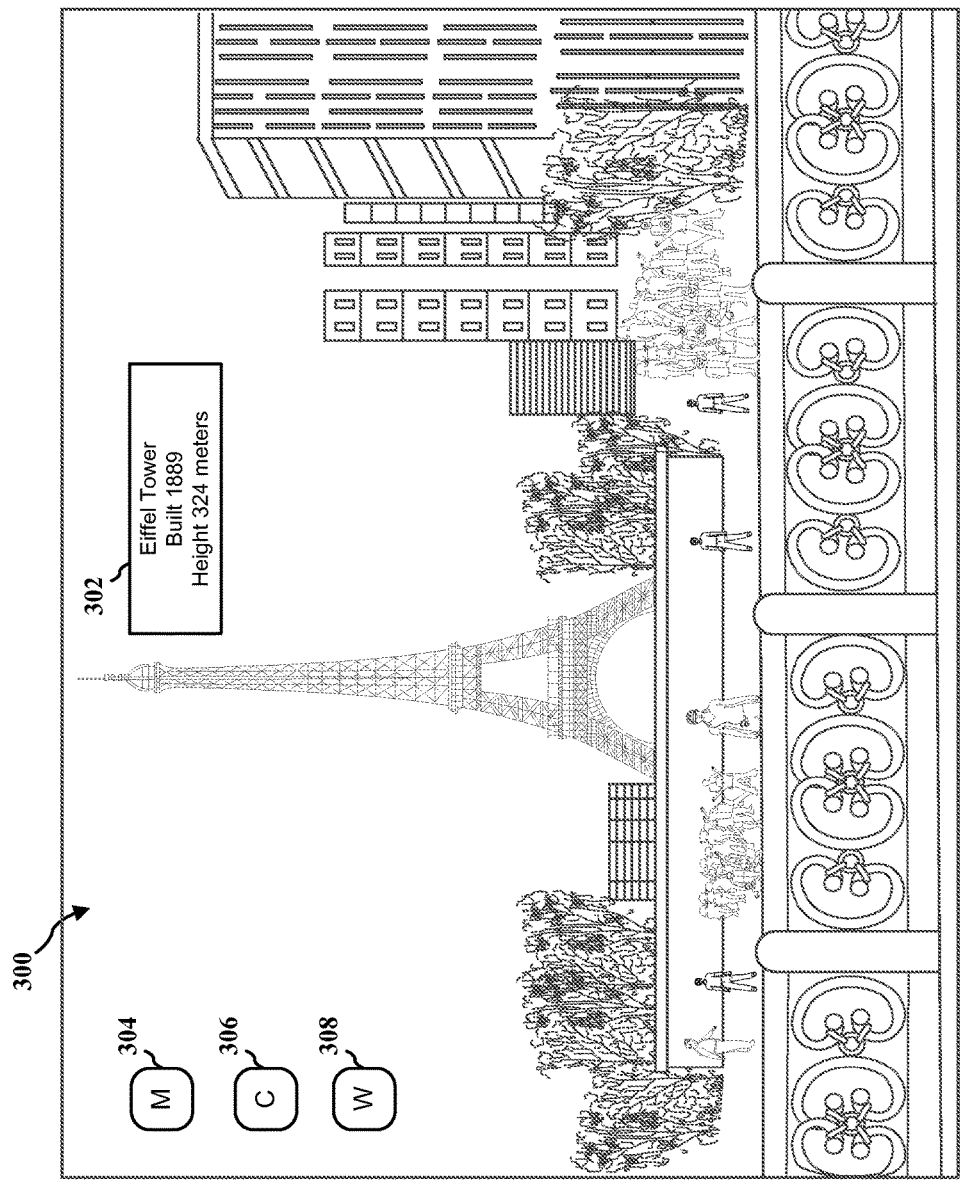
FIG. 3 is an illustration of a real-world scene through an optical see-through HMD with augmented reality.

As mentioned above, the AR device 200 allows a user to view real-world scenes through optical see-through HMDs together with content displayed on the HMDs. For example, with reference to FIG. 3, as a user is viewing a real-world scene 300 through the optical see-through HMDs 202, 204, the scene camera 208 may capture an image of the scene and send the image to the on-board processing system 206. The processing system 206 may process the image and output AR content 302 for display on the HMDs 202, 204. The content 302 may provide information describing what the user is seeing. In some cases, the processing system 206 may transmit the image through the transceiver 212 to a remote processor (not shown) for processing. The processing system 206 may also display one or more application icons 304, 306, 308 on the HMDs 202, 204 and output application content, such as e-mails, documents, web pages, or media content such as video games, movies or electronic books, in response to user interaction with the icons.

User interaction with the AR device 200 is provided by one or more user input mechanisms, such as a gesture tracking module or an eye-gaze tracking module. Gesture tracking is provided by the scene camera 208 in conjunction with a gesture tracking module of the processing system 206. With gesture tracking, a user may attempt to activate an application by placing his finger on an application icon 304, 306, 308 in the field of view of the AR device. The scene camera 208 captures an image of the finger and sends the image to the gesture tracking module. The gesture tracking module processes the image and determines coordinates of a gesture point corresponding to where the user is pointing. The processing system 206 compares the coordinate location of the gesture point to the coordinate location of the icon on the display. If the locations match, or are within a threshold distance of each other, the processing system 206 determines that the user has selected the icon 304, 306, 308 and accordingly, launches the application. Often, such eye-gaze based launching is coupled with another form of input, e.g., gesture, to confirm the user's intention of launching the application.

Eye-gaze tracking is provided by the eye tracking components (not visible) in conjunction with an eye tracking module of the processing system 206. A user may attempt to activate an application by gazing at an application icon 304, 306, 308 in the field of view of the AR device. The eye tracking components capture images of the eyes, and provide the images to the eye tracking module. The eye tracking module processes the images and determines coordinates of an eye-gaze point corresponding to where the user is looking. The processing system 206 compares the coordinate location of the eye-gaze point to the coordinate location of the icon on the display. If the locations match, or are within a threshold distance of each other, the processing system 206 determines that the user has selected the icon 304, 306, 308 and accordingly, launches the application.

Figure 4:
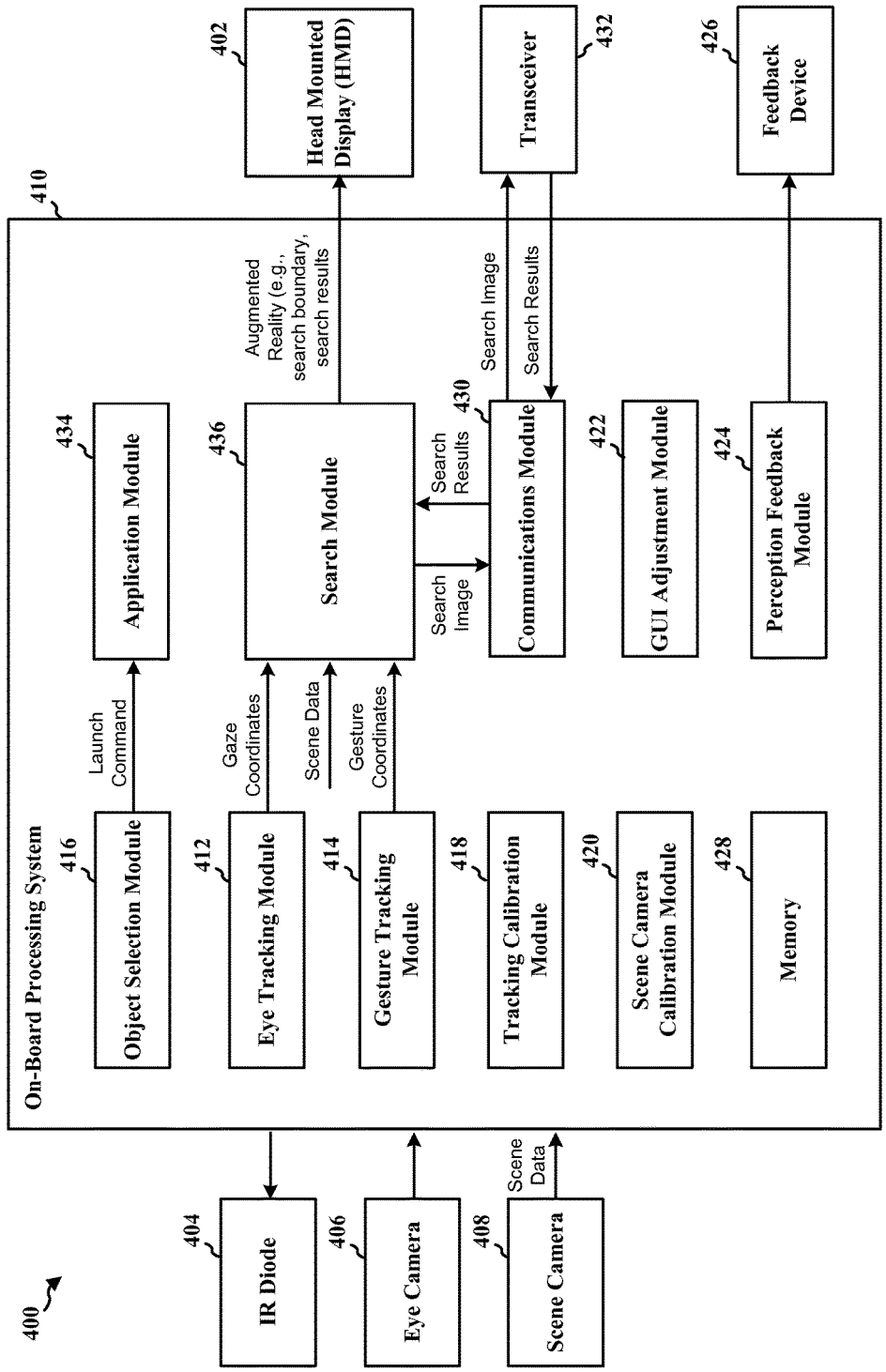
FIG. 4 is a diagram illustrating elements of an AR device.

FIG. 4 is a diagram illustrating elements of an example AR device 400 with optical see-through HMDs 402. The AR device 400 may include one or more sensing devices, such as infrared (IR) diodes 404 facing toward the wearer of the AR device and eye cameras 406 facing toward the wearer. A scene camera 408 facing away from the wearer captures images of the field of view seen by the user through the HMD 402. The cameras 406, 408 may be video cameras. While only one IR diode 404 and one eye camera 406 are illustrated, the AR device 400 typically includes several diodes and cameras for each of the left eye and right eye. A single scene camera 408 is usually sufficient. For ease of illustration only one of each sensor type is shown in FIG. 4.

The AR device 400 includes an on-board processing system 410, which in turn includes one or more of an eye tracking module 412 and a gesture tracking module 414. An object selection module 416 processes the outputs of the one or more tracking modules to determine user interactions and tracking module accuracy. A tracking calibration module 418 calibrates the one or more tracking modules if the tracking module is determined to be inaccurate.

The on-board processing system 410 may also include a scene camera calibration module 420, a graphical user interface (GUI) adjustment module 422, a perception feedback module 424, and a search module 436. The scene camera calibration module 420 calibrates the AR device so that the AR content is aligned with real world objects. The GUI adjustment module 422 may adjust the parameters of GUI objects displayed on the HMD to compensate for eye-tracking or gesture-tracking inaccuracies detected by the object selection module 416. Such adjustments may precede, supplement, or substitute for the actions of the tracking calibration module 418. The feedback module 424 controls one or more feedback devices 426 to provide perception feedback to the user in response to one or more types of user interactions. For example, the feedback module may command a feedback device 426 to output sound when a user selects an icon in the field of view using a gesture or eye gaze. The search module 436 identifies and captures a portion of a real world object seen through the optical see-through HMD for purposes of conducting online searches. The portion to be captured is identified by the search module 436 based on real world scene data provided by the scene camera 408 and one of gaze coordinates provided by the eye tracking module 412, and gesture coordinates provided by the gesture tracking module 414.

The AR device 400 further includes memory 428 for storing program code to implement the foregoing features of the on-board processing system 410. A communications module 430 and transceiver 432 facilitate wireless communications with remote devices, systems and networks. For example, in one implementation, an image of a real-world object may be captured by the search module 436 and transmitted by the communications module 430 and the transceiver 432 to a remote search engine, with subsequent search results being received by the transceiver.

With further respect to eye tracking capability, the diodes 404 and eye cameras 406, together with the eye tracking module 412, provide eye tracking capability as generally described above. In the example implementation of FIG. 4, the eye tracking capability is based on known infrared technology. One such known technology uses infrared light emitting diodes and infrared sensitive video camera for remotely recording images of the eye. Infrared light output by the diode 404 enters the eye and is absorbed and re-emitted by the retina, thereby causing a "bright eye effect" that makes the pupil brighter than the rest of the eye. The infrared light also gives rise to an even brighter small glint that is formed on the surface of the cornea. The eye tracking module 412 acquires a video image of the eye from the eye camera 406, digitizes it into a matrix of pixels, and then analyzes the matrix to identify the location of the pupil's center relative to the glint's center, as well as a vector between these centers. Based on the determined vector, the eye tracking module 412 outputs eye gaze coordinates defining an eye gaze point (E).

The scene camera 408, together with the gesture tracking module 414, provide gesture tracking capability using a known technology as generally described above. In the example implementation of FIG. 4, the gesture tracking capability is based on gesture images captured by the scene camera 408. The gesture images are processed by the gesture tracking module 414 by comparing captured images to a catalog of images to determine if there is a match. For example, the user may be pointing at an icon in the field of view. The gesture tracking module 412 may detect a match between the gesture image and a cataloged image of pointing and thereby recognize the gesture as pointing. Upon detection of a recognized gesture, the gesture tracking module 414 processes the captured image further to determine the coordinates of a relevant part of the gesture image. In the case of finger pointing, the relevant part of the image may correspond to the tip of the finger. The gesture tracking module 414 outputs gesture coordinates defining a gesture point (G).

The object selection processor 416 functions to determine whether interactions of the user, as characterized by one or more of the eye tracking module 412 and the gesture tracking module 414, correspond to a selection of an object, e.g., application icon, displayed on the HMD 402 and visible in the field of view. If an interaction does correspond to a selection by the user, for example, a selection of an icon to launch an application 434, the object selection processor 416 outputs a command to the application.

As previously mentioned, the AR device 410 may provide for online searching related to objects seen through the optical see-through HMD. Components of the AR device that facilitate such searching include the scene camera 408, one or more of the user interaction tracking modules, e.g., the eye tracking module 412 and the gesture tracking module 414, the object portion identification module 4xx, and communication module 430.

Figure 5:
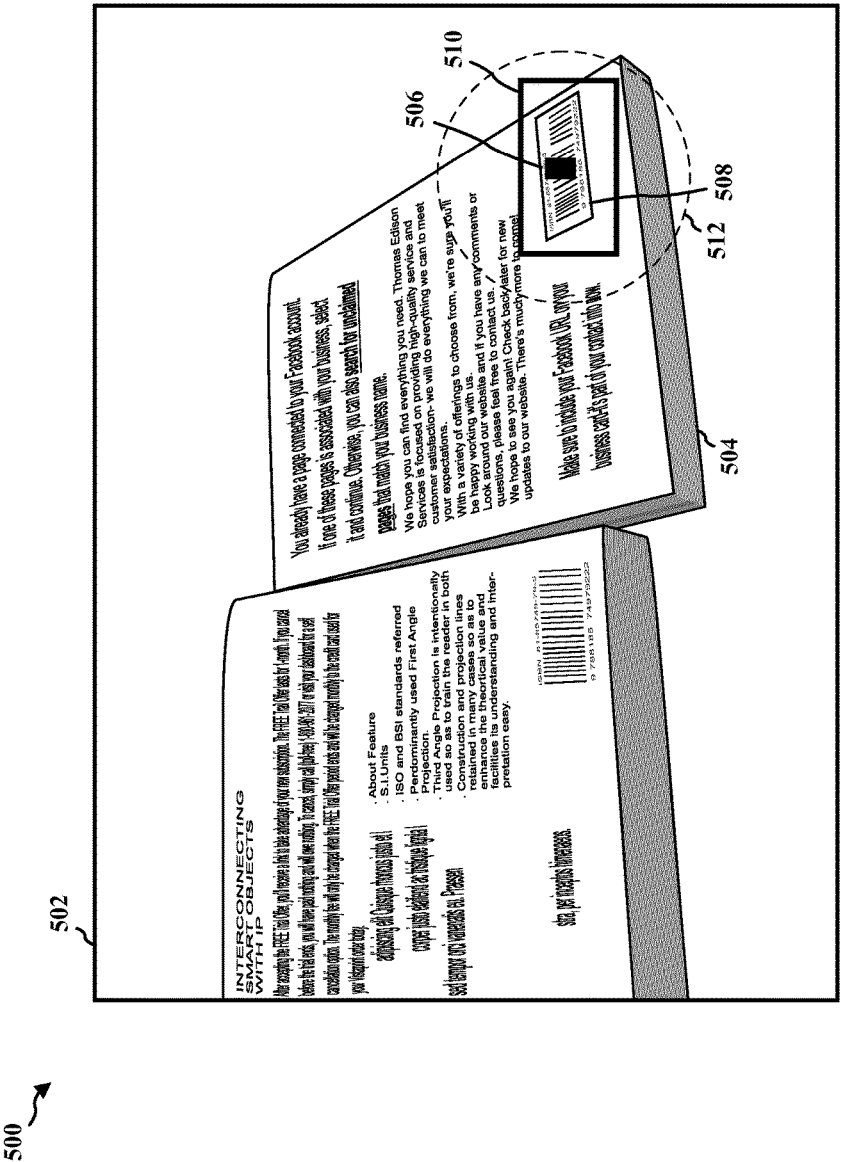
FIG. 5 is an illustration of a real-world scene visible to a user through an optical see-through HMD, including an object of interest to be searched on line.
Figure 6:
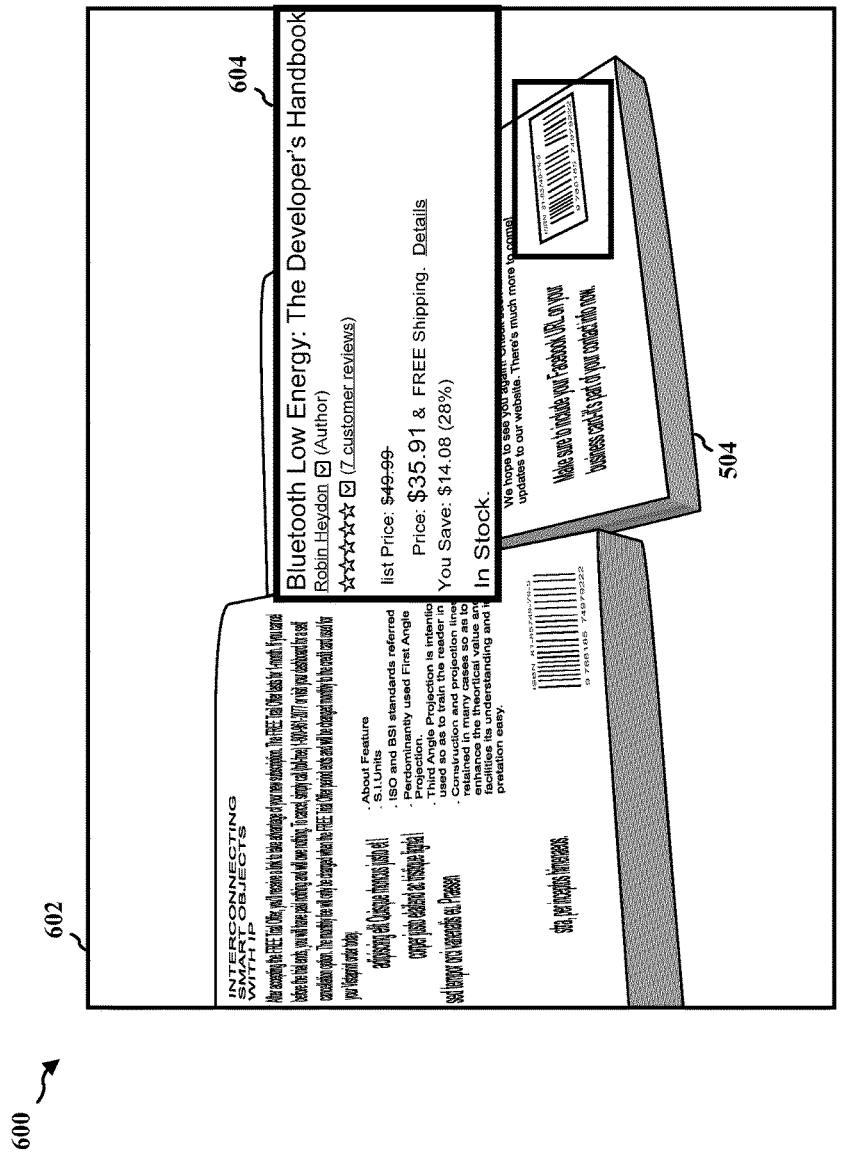
FIG. 6 is an illustration of an augmented reality scene visible to a user that includes the real-world scene of FIG. 5 and the augmented reality search result.

FIG. 5 is an illustration 500 of a real-world scene 502 visible to a user through an optical see-through HMD, including an object 504 of interest to be searched on line. FIG. 6 is an illustration of an augmented reality scene visible to a user that includes the real-world scene of FIG. 5 and the augmented reality search result. In FIG. 5, the real-world scene 502 includes an object of interest 504 to be searched on line. In the example of FIG. 5, the object 504 is a book. The eye tracking module 412 is configured to track movement of the user's eye and to detect when the user is gazing at a portion of the object 504. In this case, the user is determined to be gazing at a point 506 overlaying the portion 508 of the book where the barcode is located.

The search module 436 receives data from the scene camera 408 corresponding to a captured scene (herein referred to as "scene data") and data from the eye tracking module 412 corresponding to the eye gaze of the user (herein referred to as "gaze coordinates" or "eye gaze data"). The search module 436 processes the scene data and the eye gaze data to identify the portion 508 of the object 504 and to provide an image of the portion. With reference to FIG. 5, the search module 436 determines the portion 508 of the object, and then determines a boundary 510 around the portion. The image of the portion corresponds to the scene that lies within the boundary 510. Accordingly, the size of the image is less than the size of the object 504 as well as the scene data 502 in the field of view.

Data corresponding to the image of the portion is provided to the communications module 430, which in turn, transmits the image data to the online visual search engine 106 over the communications network 104. The communications module 430 may be, for example, a Bluetooth device. Search results are transmitted back to the AR device, received by the communications module 430 and provided to the search module 436 for display. With reference to FIG. 6, search results 604 are displayed on the HMD screen in the vicinity of the object 504.

Figure 7:
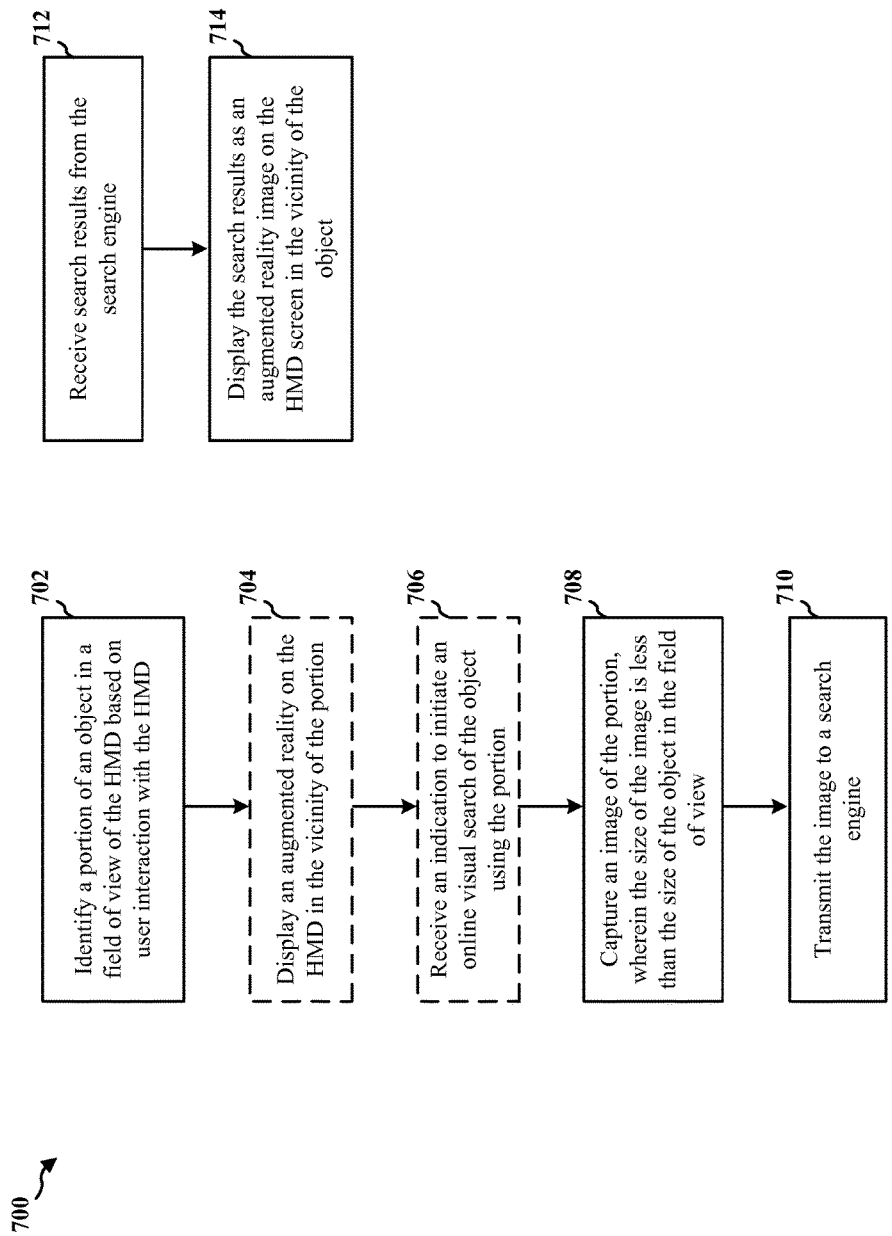
FIG. 7 is a flow chart of a method of conducting online searches of objects visible through an AR device having an optical see-through HMD.

FIG. 7 is a flowchart of a method of conducting an online visual search through an AR device having an optical see-through HMD. At step 702, the AR device identifies a portion 508 of an object 504 in a field of view of the HMD based on user interaction with the HMD. In one configuration, the user interaction may be an eye gaze 506, in which case the AR device identifies a portion 508 of an object by tracking the eye gaze 506 of the user to determine a location of the eye gaze, locating a region 512 of the object corresponding to the location of the eye gaze, and detecting the portion 508 within the region. In another configuration, the user interaction may be a gesture, in which case the AR device identifies a portion of an object by tracking the gesture of the user to determine a location of the gesture, locating a region of the object corresponding to the location of the gesture, and detecting the portion within the region.

At step 704, the AR device may display an augmented reality 510 on the HMD in the vicinity of the detected portion 508. The augmented reality 510 may be a boundary around the portion 508.

At step 706, the AR device may receive an indication to initiate an online visual search of the object 504 using content contained the portion 508. For example, upon seeing the augmented reality 510 that identifies the portion 508 of the object, the user may request that the AR device initiate an online search of the object based on the portion. Such a request may be input by the user through a physical search activation button on the AR device or through user interaction with the HMD screen. In the latter case, the AR device may display a search icon on the HMD screen and the search may be initiated through user interaction, e.g., eye gaze or gesture, with the search icon.

At step 708, the AR device captures an image of the portion 508. The image may correspond to the area of the object 504 within the boundary 510. Accordingly, the size of the image is less than the size of the object in the field of view. At step 710, the AR device transmits the image to a search engine.

At step 712, the AR device receives search results from the search engine, and at step 714, displays the search results as an augmented reality image 604 on the HMD screen in the vicinity of the object 504.

Figure 8:
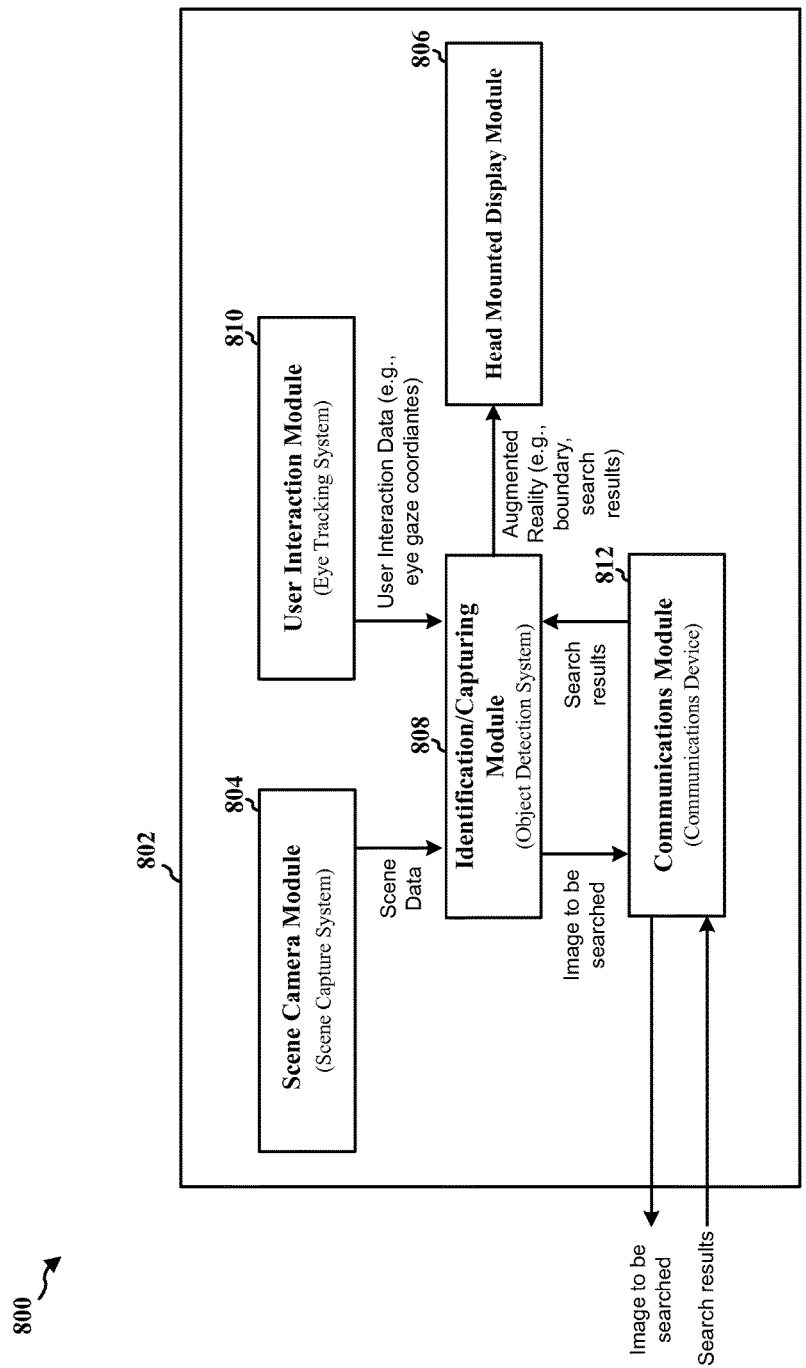
FIG. 8 is a diagram illustrating elements of an AR device that conducts online searches of objects visible through an optical see-through HMD.

FIG. 8 is a diagram 800 illustrating elements of an AR device 802 that conducts online visual searches. The AR device 802 includes a scene camera module 804, a HMD module 806, an identification/capture module 808, a user interaction module 810 and a communications module 812. These modules may be referred to by different names, as indicated parenthetically, and may correspond to one or more of the modules of FIG. 4. For example, the user interaction module 810 may be the eye tracking module 412 or the gesture tracking module 414, and the identification/capture module 808 may be the search module 436.

The identification/capture module 808 identifies a portion of an object in a field of view of the HMD based on user interaction with the HMD. To this end, the scene camera module 804 provides scene data to the object portion identification module 808, and the user interaction module 810 provides user interaction data to the identification/capture module 808. The scene data corresponds to image data of the real world scene visible in the field of view of the HMD module 806 and captured by the camera 804. The user interaction data may be eye gaze data or gesture data. In either case, the user interaction data includes coordinate data that defines a user interaction point, eye-gaze point (E), in terms of the coordinate system corresponding to the HMD screen.

In the case where the user interaction is an eye gaze, the identification/capture module 808 identifies a portion 508 of an object 504 by tracking the eye gaze of the user to determine a location of the eye gaze, locating a region 512 of the object corresponding to the location of the eye gaze, and detecting the portion 508 within the region. In the case where the user interaction is a gesture, the identification/capture module 808 identifies a portion of an object by track the gesture of the user to determine a location of the gesture, locating a region of the object corresponding to the location of the gesture, and detecting the portion within the region.

Upon detecting the portion 508, the identification/capture module 808 captures an image of the portion. To this end, the identification/capture module 808 may determine a boundary around the portion and display the boundary as an augmented reality on the HMD. In one configuration, the image of the portion includes only image data within the boundary 510. This is beneficial in that it reduces the amount of image data to be transmitted to the search engine and also provides a more focused search by reducing the amount of extraneous searchable content from the search request.

The communication module 812 transmits the image to a search engine. Subsequently, the communication module 812 receives data corresponding to search results from the search engine. The search results may be provided to the identification/capturing module 808 and displayed as an augmented reality image on the HMD screen in the vicinity of the object.

The AR devices, as illustrated in FIGS. 4 and 8 may include additional modules that perform each of the steps of the algorithm in the aforementioned flow chart of FIG. 7. As such, each step in the aforementioned flow chart of FIG. 7 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 9:
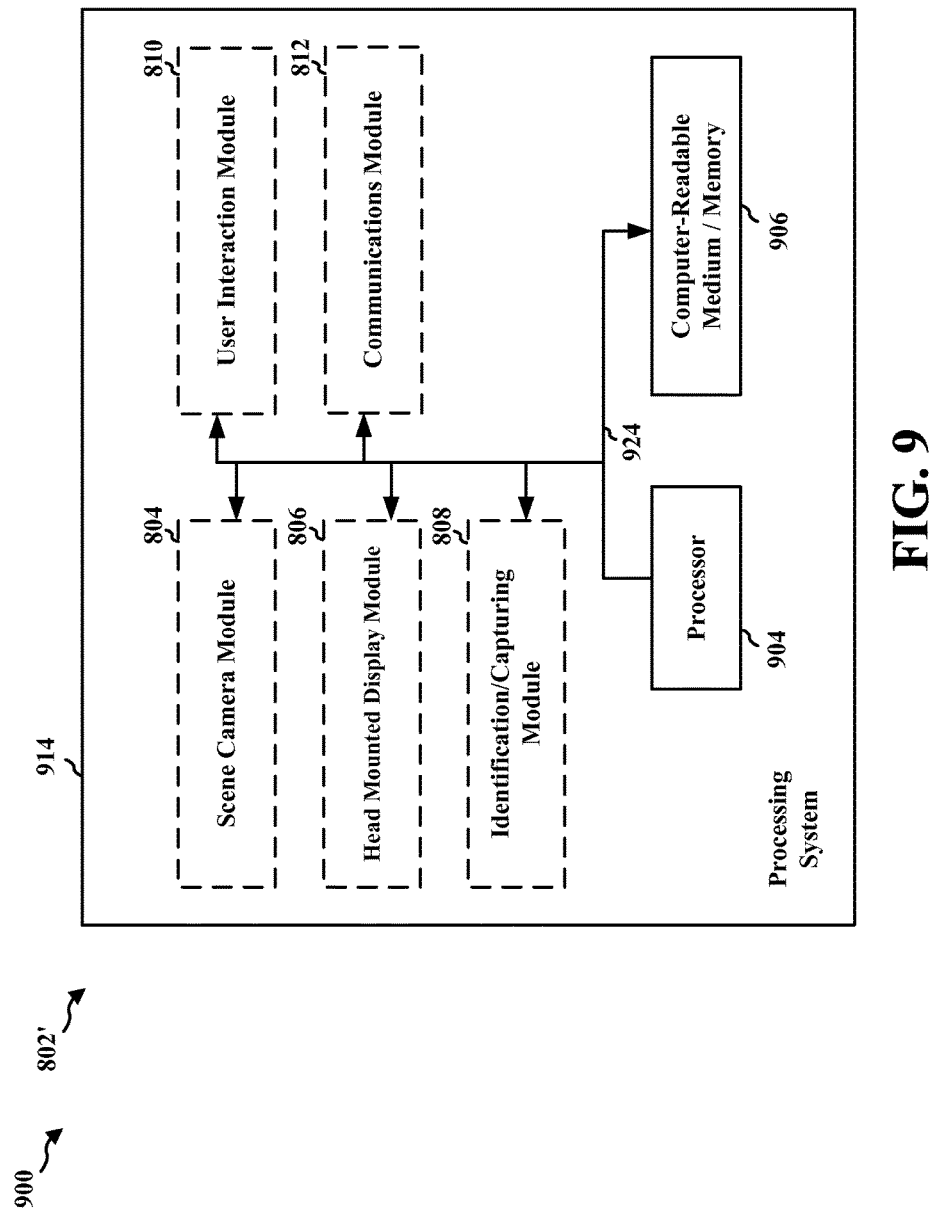
FIG. 9 is a diagram illustrating an example of a hardware implementation for an AR device employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware modules, represented by the processor 904, the modules 804, 806, 808, 810, 812 and the computer-readable medium/memory 906. The bus 924 may also link various other circuits such as timing sources, peripherals, voltage regulators, and power management circuits, which are well known in the art, and therefore, will not be described any further.

The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system further includes at least one of the modules 804, 806, 808, 810 and 812. The modules may be software modules running in the processor 904, resident/stored in the computer readable medium/memory 906, one or more hardware modules coupled to the processor 904, or some combination thereof.

In one configuration, the apparatus 802/802' includes means for identifying a portion of an object in a field of view of the HMD based on user interaction with the HMD, means for capturing an image of the portion, wherein the size of the image is less than the size of the object in the field of view, and means for transmitting the image to a search engine. The apparatus 802/802' also includes means for displaying an augmented reality on the HMD in the vicinity of the portion, means for receiving an indication to initiate an online visual search of the object using the portion, means for receiving search results from the search engine; and means for displaying the search results as an augmented reality image on the HMD screen in the vicinity of the object. The aforementioned means may be one or more of the aforementioned modules of the apparatus 802 and/or the processing system 914 of the apparatus 802' configured to perform the functions recited by the aforementioned means.

In summary, methods and apparatus disclosed herein allow a user to select only a subset of scene with an eye gaze that contains an object of interest. With reference to FIGS. 5 and 6, a visual search using a HMD with augmented reality and eye tracking works as follows: A user looks at the object of interest in a scene visible through the HMD and initiates a visual search via other input techniques such as a gesture. An eye tracking system included in the HMD system determines a location of a gaze point corresponding to the point of the scene at which the user is gazing. The eye tracking system identifies the object of interest based on the gaze point. For example, with reference to FIG. 5, based on the location of the eye gaze, the eye tracking system identifies the object of interest as the bar code. Such identification may be made by color recognition, wherein the system detects a change in color between the edge of the bar code and the back cover of the book.

With continued reference to FIG. 5, once the eye tracking system determines the object of interest, it identifies an area of the scene containing the object and highlights the area with an augmented reality, such as an augmented reality boundary surrounding the object. The selected part of the scene corresponding to the area within the boundary is extracted and sent to the cloud (online visual search engine e.g. Google Goggles) for further analysis. As shown in FIG. 6, the user's view is augmented with the retrieved search result.

The benefits of this approach are: The user is not required to move to the object of interest. Only relevant part of the image is sent to the cloud; thus saves redundant data transfer. Minimum workload on the search engine since it does not need to analyze all objects presented in the user's scene, only a subset which contains object of interest.

In an aspect of the disclosure, a method, an apparatus, and a computer program product provide for conducting an online visual search of an object present in a scene visible through a head mounted display worn by a user. A method includes tracking an eye gaze of the user to locate the object, capturing an image of the object, and transmitting the image of the object to a search engine. The size of the image is less than the size of the scene. The method may also include receiving an indication to initiate an online visual search of an object. The method may further include receiving search results from the search engine, and displaying the search results as an augmented reality image on the HMD screen in the vicinity of the object.

A corresponding apparatus for conducting an online visual search of an object present in a scene visible through a head mounted display worn by a user, includes means for tracking an eye gaze of the user to locate the object, means for capturing an image of the object, and means for transmitting the image of the object to a search engine. The size of the image is less than the size of the scene. The apparatus may also include means for receiving an indication to initiate an online visual search of an object. The apparatus may further include means for receiving search results from the search engine, and means for displaying the search results as an augmented reality image on the HMD screen in the vicinity of the object.

Another corresponding apparatus for conducting an online visual search of an object present in a scene visible through a head mounted display worn by a user, includes a memory, and at least one processor coupled to the memory and configured to track an eye gaze of the user to locate the object, capture an image of the object, and transmit the image of the object to a search engine. The size of the image is less than the size of the scene. The processor may be configured to receive an indication to initiate an online visual search of an object. The processor may be further configured to receive search results from the search engine, and display the search results as an augmented reality image on the HMD screen in the vicinity of the object.

A computer program product for conducting an online visual search of an object present in a scene visible through a head mounted display worn by a user, includes a computer-readable medium comprising code for tracking an eye gaze of the user to locate the object, for capturing an image of the object, and for transmitting the image of the object to a search engine. The size of the image is less than the size of the scene. The product may include code for receiving an indication to initiate an online visual search of an object. The product may further include code for receiving search results from the search engine, and displaying the search results as an augmented reality image on the HMD screen in the vicinity of the object.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of conducting an online visual search through an augmented reality (AR) device having a display, said method comprising:
   capturing, via an image capture device of the AR device, a scene in a field of view of the display;
   identifying, via at least one processor of the AR device, a portion of the scene based on a first user interaction with the display;
   displaying AR content on the display in response to the first user interaction, the AR content comprising indicia associated with the identified portion of the scene;
   receiving, after displaying the AR content on the display, an indication to initiate an online visual search of the identified portion of the scene based on a second user interaction with a search icon displayed on the display, the second user interaction occurring after the first user interaction, wherein the second user interaction comprises a non-eye gaze gesture; and
   transmitting, by the AR device in response to the second user interaction, an image of the identified portion of the scene to a search engine, wherein the image includes the identified portion of the scene and does not include content in the field of view of the display outside of the identified portion of the scene.

2. The method of claim 1, wherein the first user interaction comprises an eye gaze and the identifying the portion of the scene comprises:
   tracking the eye gaze of a user to determine a location of the eye gaze;
   locating a region of the scene corresponding to the location of the eye gaze; and
   detecting the portion of the scene within the region.

3. The method of claim 1, wherein the first user interaction comprises a gesture and the identifying the portion of the scene comprises:
   tracking the gesture of a user to determine a location of the gesture;
   locating a region of the scene corresponding to the location of the gesture; and
   detecting the portion of the scene within the region.

4. The method of claim 1, wherein the indicia comprises a boundary around the portion of the scene.

5. The method of claim 1, further comprising:
   receiving search results from the search engine; and
   displaying the search results as an AR image on the display.

6. The method of claim 1, further comprising:
   processing, via the at least one processor of the AR device in response to the second user interaction, the scene to generate the image of the identified portion of the scene for transmission.

7. The method of claim 6, wherein a transceiver of the AR device is configured to transmit the image of the portion of the scene to the search engine, and wherein the method further comprises:
   providing, via the at least one processor of the AR device, the image of the identified portion of the scene to the transceiver of the AR device.

8. The method of claim 1, wherein the image capture device is a video camera.

9. An apparatus for conducting an online visual search through an augmented reality (AR) device having a display, said apparatus comprising:
   means for capturing a scene in a field of view of the display;
   means for identifying a portion of the scene based on a first user interaction with the display;
   means for displaying AR content on the display in response to the first user interaction, the AR content comprising indicia associated with the identified portion of the scene;
   means for receiving, after displaying the AR content on the display, an indication to initiate an online visual search of the identified portion of the scene based on a second user interaction with a search icon displayed on the display, the second user interaction occurring after the first user interaction, wherein the second user interaction comprises a non-eye gaze gesture; and
   means for transmitting, in response to the second user interaction, an image of the identified portion of the scene to a search engine, wherein the image includes the identified portion of the scene and does not include content in the field of view of the display outside of the identified portion of the scene.

10. The apparatus of claim 9, wherein the first user interaction comprises an eye gaze and the means for identifying the portion of the scene is configured to:
track the eye gaze of a user to determine a location of the eye gaze;
locate a region of the scene corresponding to the location of the eye gaze; and
detect the portion of the scene within the region.

11. The apparatus of claim 9, wherein the first user interaction comprises a gesture and the means for identifying the portion of the scene is configured to:
track the gesture of a user to determine a location of the gesture;
locate a region of the scene corresponding to the location of the gesture; and
detect the portion of the scene within the region.

12. The apparatus of claim 9, wherein the indicia comprises a boundary around the portion of scene.

13. The apparatus of claim 9, further comprising:
means for receiving search results from the search engine; and
means for displaying the search results as an AR image on the display.

14. The apparatus of claim 9, further comprising:
means for processing, in response to the second user interaction, the scene to generate the image of the identified portion of the scene for transmission.

15. The apparatus of claim 14, further comprising:
means for providing the image of the identified portion of the scene to the means for transmitting the image of the identified portion of the scene to the search engine.

16. An apparatus for conducting an online visual search through an augmented reality (AR) device having a display, said apparatus comprising:
a memory;
an image capture device configured to capture a scene in a field of view of the display;
a transceiver; and
at least one processor coupled to the memory and transceiver, wherein the at least one processor is configured to:
identify a portion of the scene based on a first user interaction with the display;
display AR content on the display in response to the first user interaction, the AR content comprising indicia associated with the identified portion of the scene;
receive, after the AR content is displayed on the display, an indication to initiate an online visual search of the identified portion of the scene based on a second user interaction with a search icon displayed on the display, the second user interaction occurring after the first user interaction, wherein the second user interaction comprises a non-eye gaze gesture; and
cause, in response to the second user interaction, the transceiver to transmit an image of the identified portion of the scene to a search engine, wherein the image includes the identified portion of the scene and does not include content in the field of view of the display outside of the identified portion of the scene.

17. The apparatus of claim 16, wherein the first user interaction comprises an eye gaze and to identify the portion of the scene, the at least one processor is configured to:
track the eye gaze of a user to determine a location of the eye gaze;
locate a region of the scene corresponding to the location of the eye gaze; and
detect the portion of the scene within the region.

18. The apparatus of claim 16, wherein the first user interaction comprises a gesture and to identify the portion of the scene, the at least one processor is configured to:
track the gesture of a user to determine a location of the gesture;
locate a region of the scene corresponding to the location of the gesture; and
detect the portion of the scene within the region.

19. The apparatus of claim 16, wherein the indicia comprises a boundary around the scene.

20. The apparatus of claim 16, wherein the at least one processor is configured to:
receive search results from the search engine; and
display the search results as an AR image on the display.

21. The apparatus of claim 16, wherein the at least one processor is configured to:
process, in response to the second user interaction, the scene to generate the image of the identified portion of the scene for transmission.

22. The apparatus of claim 21, wherein the at least one processor is configured to:
provide the image of the identified portion of the scene to the transceiver of the AR device.

23. The apparatus of claim 16, wherein the image capture device is a video camera.

24. A non-transitory computer-readable medium having instructions stored thereon that, when executed, cause at least one processor of an augmented reality (AR) device having a display to:
cause an image capture device of the AR device to capture a scene in a field of view of the display;
identify, via the at least one processor of the AR device, a portion of the scene based on a first user interaction with the display;
display AR content on the display in response to the first user interaction, the AR content comprising indicia associated with the identified portion of the scene;
receive, after the AR content is displayed on the display, an indication to initiate an online visual search of the identified portion of the scene based on a second user interaction with a search icon displayed on the display, the second user interaction occurring after the first user interaction, wherein the second user interaction comprises a non-eye gaze gesture; and
cause, in response to the second user interaction, the AR device to transmit an image of the identified portion of the scene to a search engine, wherein the image includes the identified portion of the scene and does not include content in the field of view of the display outside of the identified portion of the scene.

25. The non-transitory computer-readable medium of claim 24, further comprising instructions stored thereon that, when executed, cause the at least one processor of the AR device to:
process, in response to the second user interaction, the scene to generate the image of the identified portion of the scene for transmission.

26. The non-transitory computer-readable medium of claim 25, wherein a transceiver of the AR device is configured to transmit the image of the portion of the scene to the search engine, and wherein the non-transitory computer-readable medium further comprises instructions that, when executed, cause the at least one processor of the AR device to:

provide the image of the identified portion of the scene to the transceiver of the AR device.

27. The non-transitory computer-readable medium of claim 24, wherein the image capture device is a video camera.

\* \* \* \* \*